Feb. 24, 1942.   E. B. ANDERSON   2,273,920
UNIVERSAL JOINT
Filed May 12, 1939
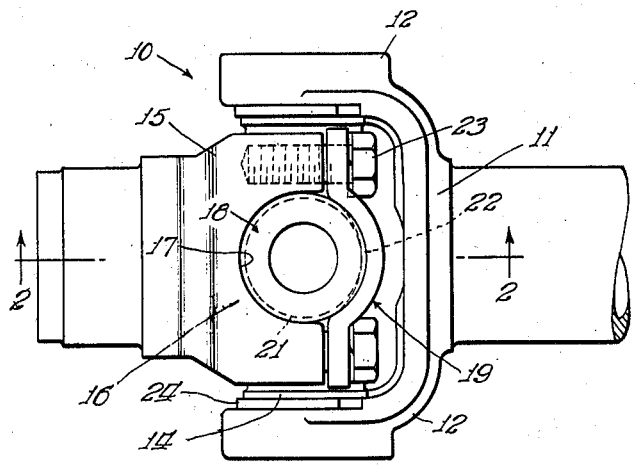
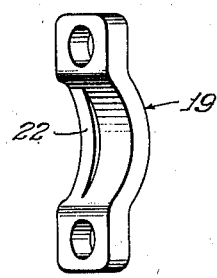
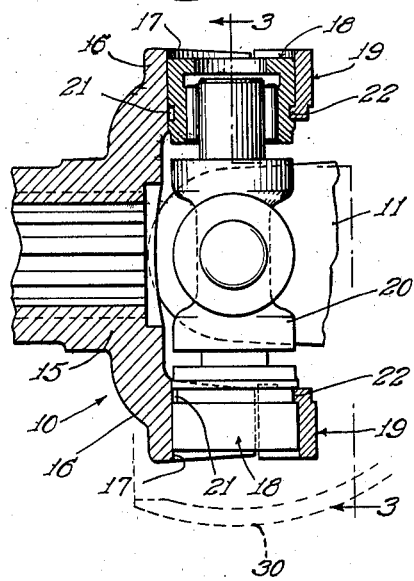
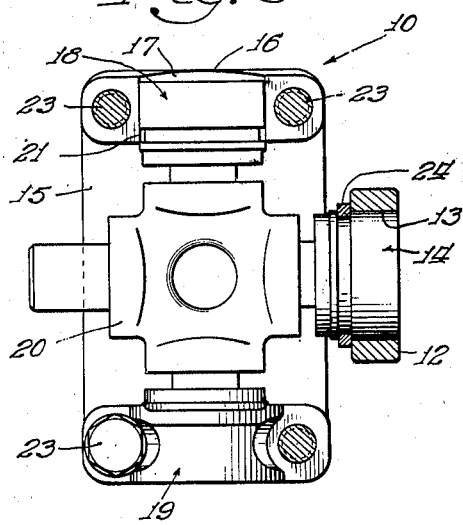
Inventor:
Edmund B. Anderson
By: Edward C. Gritzbaugh
Atty.

Patented Feb. 24, 1942

2,273,920

UNITED STATES PATENT OFFICE 2,273,920

UNIVERSAL JOINT

Edmund B. Anderson, Rockford, Ill., assignor to Borg-Warner Corporation, Chicago, Ill., a corporation of Illinois Application May 12, 1939, Serial No. 273,203

5 Claims. (Cl. 64—17)

This invention relates to universal joints and particularly to an improved construction of bearing cup and retaining strap therefor.

It is an object of this invention to provide an improved form of bearing cup and retaining strap providing for the ready assembly and disassembly of the universal joint without disturbing the line of shafting with which the joint cooperates.

It is a further object to provide in such an arrangement an improved form of strap and bearing cup that is effective to both accurately define the spaced relationship between the opposed bearing cups and also effective to prevent radial outward movement of the bearing cups.

Still another object is to accomplish the above, while at the same time reducing the number of parts normally employed without sacrificing the function thereof.

Other detailed objects, advantages and uses of my invention will become apparent from a reading of the attached specification taken together with the accompanying drawing forming a part thereof and wherein:

Fig. 1 is an assembly view of a universal joint embodying my invention;

Fig. 2 is a section view taken substantially on line 2—2 of Fig. 1;

Fig. 3 is a partial section view taken substantially on line 3—3 of Fig. 2; and

Fig. 4 is a perspective-like view of my improved strap forming part of the assembly shown in Fig. 1.

In accordance with my invention, each of the bearing cups of one pair is formed with an annular recess about the periphery thereof intermediate the ends. The retaining caps are formed with complementary protuberances for reception in the bearing cup recess. This relationship serves the dual function of fastening the bearing cups to the yoke and definitely spacing the cups against radial outward movement.

Referring in greater detail to the figures of the drawing a universal joint incorporating my invention is indicated generally at 10 and is composed essentially of a first yoke member 11 having arms 12 formed with oppositely disposed ring seats 13 receiving a first set of bearing cups 14 and a second yoke member 15 having arms 16 formed with oppositely disposed arcuate seats 17 for partially embraced reception of a second set of bearing cups of improved construction indicated generally at 18 retained therein by an improved strap indicated generally at 19, the respective sets of bearing cups receiving oppositely extending pairs of trunnions forming part of a spider or intermediate pivotal member indicated at 20.

Bearing cups 18 are formed on the outer periphery between the ends with an annular recess 21. This recess may be readily provided by a turning operation or other means.

The straps 19 are formed on the inner periphery with radially inwardly extending protuberance 22 substantially complementary in size and form to that portion of annular recess 21 closely adjacent thereto. This strap may be readily formed by a hot or cold rolling or stamping operation.

In addition to the above structure there is provided bolts 23 for fastening straps 19 to yoke arm 16. Snap rings 24 function to prevent the radial outward movement of bearing cups 14 relative to their embracing seats 13. There is provided the usual arrangement of telescoping spherical-like housing, one portion of which is indicated in dotted lines at 30 for confining the lubricant and shielding the joint against egress of foreign matter.

From the above it will be readily appreciated that the present joint can be quickly and efficiently assembled and disassembled by the removal of bolts 23 and straps 19 without disturbing the line of shafting in which the joint is arranged to cooperate. In operation the protuberances 22 on straps 19 will maintain the proper spacing between cups 18 and prevent outward radial movement thereof. The individual straps 19 combine the attaching function and the additional function of a snap ring without the necessity of providing this additional element. This structure is simple and relatively inexpensive to manufacture.

While I have illustrated my invention in connection with one particular embodiment, I contemplate other equivalent constructions and intend that my invention be defined by the appended claims which be given a scope as broad as the prior art will permit.

I claim:

1. In a universal joint of the intermediate pivotal member type including a yoke, a bearing cup, and a strap for holding said bearing cup on an arm of the yoke; said arrangement being particularly characterized by the formation in said cup of a circumferentially extending recess, and said strap being formed on its inner side with a radially inwardly and circumferentially extending flange for reception in said recess, said flange functioning to position said bearing cup axially and maintain the same against radially outward movement and providing for quick assembly and disassembly.

2. In a universal joint of the intermediate pivotal member type including a yoke member formed with a bearing cup receiving seat, a bearing cup seated therein and receiving a trunnion of said pivotal member, said cup having a circumferentially elongated recess in its periphery, and a bearing retaining strap partially embracing said bearing cup and attached adjacent its end to said yoke, said strap being formed along a longitudinal edge thereof with an integral flange extending radially inwardly and snugly fitted in said recess for securely positioning said bearing cup along its axis and restraining the same against radially outward movement.

3. In a universal joint of the intermediate pivotal member type including a yoke formed with a bearing seat, a bearing cup seated in said seat and a strap for holding the cup in said seat, said arrangement being particularly characterized by the formation in said cup of an annular recess about the periphery thereof intermediate its ends and the provision on said strap of a radially inwardly extending flange snugly received in said recess, positioning said bearing cup axially, maintaining said cup securely against radially outward movement and providing for quick assembly and disassembly.

4. In a universal joint of the intermediate pivotal member type, a yoke member formed with a semi-cylindrical bearing seat, a bearing cup having a cylindrical periphery snugly received in said seat, and having in said periphery a circumferentially extending recess intermediate the ends of the cup, and a retaining strap having an arched intermediate region complementary to and snugly engaging the portion of said bearing cup periphery which projects beyond said bearing seat, and having a radially inwardly and longitudinally extending flange snugly received in said recess and cooperating therewith for axially positioning said bearing cup and securely retaining the same against radially outward movement.

5. A universal joint as defined in claim 3, wherein said flange merges at its end regions with the interior arcuate surface of the retaining strap and gradually increases in thickness toward its central region.

EDMUND B. ANDERSON.